UNITED STATES PATENT OFFICE.

PROSPER JEAN AUGUSTE MAIGNEN, OF PHILADELPHIA, PENNSYLVANIA.

PROCESS OF SEPARATING SUSPENDED MATTER FROM LIQUIDS CONTAINING MINERAL VALUE.

932,795.

Specification of Letters Patent.   Patented Aug. 31, 1909.

No Drawing.   Application filed October 5, 1908.   Serial No. 456,135.

*To all whom it may concern:*

Be it known that I, PROSPER JEAN AUGUSTE MAIGNEN, of Philadelphia, in the State of Pennsylvania, have invented a certain new and useful Improvement in Processes of Separating Suspended Matter from Liquids Containing Mineral Value, whereof the following is a specification.

My improvement is particularly applicable to solutions of cyanid which have been employed for extracting values from metallic ores, and for the purpose of separating the spent slime from such enriched solutions. Originally such separation was effected by allowing the mixture of slime and solution to settle for a considerable period of time; the supernatant liquid being decanted or drawn off when considered clear enough. However, the particles of suspended matter are so small, and their hydraulic value, *i. e.* the velocity at which they settle in still water, is so low, that it is frequently the case that not more than 50% of the supernatant solution is clear enough for decantation after the solution has been allowed to settle for forty-eight hours. Therefore, in order to recover the metallic values that are left in the portion of the solution which is not clear enough for decantation, it is necessary to add fresh water, allow more time for settling, and again remove such portion of the supernatant solution as is clear enough for decantation.

The cycle of operations aforesaid, necessary to effect the clarification and recovery of the dissolved values in this manner, must ordinarily be repeated from four to twelve times, and may require fifteen days or more for its completion. Even then the decanted solution is not clear enough to be sent to the precipitation boxes without filtration. Various attempts have been made to accelerate the sedimentation of the slimes from such solutions by the addition of lime, (calcium hydrate), but it appears that the addition of the lime does little more than increase the alkalinity and the amount of solid matter to be separated from the solution by sedimentation or otherwise. Other chemicals which have been tried, and the effects thereof, may be noted as follows:—Caustic potash, sulfuric acid, and alum, which after forty-eight hours' settling of the solution render respectively 40%, 37%, and 39% of the supernatant solution clear enough for decantation. However, the physical effects obtained by the addition of said chemicals have not been considered such as to justify their employment on a practical scale. The use of any single one of them if added in small quantity, produces no appreciable coagulating effect, and if used in excess it has, necessarily, a deleterious effect on the value bearing solution. For instance, too much free alkali interferes with the solvent power of the cyanid, and is apt to cause the reprecipitation of the dissolved metals, particularly silver. Moreover, the addition of acid to the enriched solution consumes cyanid, decomposes the solution, and forms the dangerous hydro-cyanic acid.

It is the object of my invention to effect the rapid separation of slime from solutions which have been enriched by metallic ore values, and to effect such separation solely by sedimentation, and in practice it is found that the process herein described, effects complete sedimentation and clarification of a cyanid solution in less than half an hour, and without any modification of such solution which would in any wise interfere with its subsequent employment in accordance with the practice of the art.

My process consists in adding simultaneously to the slimy solution, an acid salt and an alkaline salt, of such character and proportions that they interact upon each other energetically, without affecting or being materially affected by the metallic or other salts dissolved in the solution under treatment, and, I have found that aluminum sulfate and sodium carbonate are suitable salts for the purpose contemplated. I note that if either of these reagents were added to the slimy solution alone, they would for the reasons above stated, have an injurious effect upon the recovery of the dissolved metals. However, when said acid and alkaline salts are used together in accordance with my process, the double decomposition thereof is so rapid and complete, that no harm can be done to the metallic values of the solution, even if a considerable excess of said salts is employed. This feature of the process is very important because whatever quantity is found necessary to produce a rapid and perfect clarification of the solution, may be used without injury to the dissolved values.

The coagulation resulting from my process is analogous to that produced by the addition of white of egg to hot coffee solution, or isinglass to wine. That is to say, there is produced a network of gelatinous flakes having the property of catching and holding the fine particles of suspended matter so that as said network of flakes sinks to the bottom of the solution, it carries with it the suspended matter and leaves the supernatant solution clear. In the practice of my process, it is found that all of the particles of slime suspended in the solution are precipitated in less than twenty minutes, although a few minutes longer may be required for the subsidence of some of the flakes which have done no work in separating the particles of ore. The final result of my process is a perfectly clear solution which has lost none of its metallic values.

When the reagents aforesaid, aluminum sulfate and sodium carbonate, are used in their commercial powdered form, they may be added separately, simultaneously to the solution or mixture to be clarified, or they may be mixed together and added as one mixed powder. In the latter case, when the mixed powder is to be kept for any considerable time before being used, I find it desirable to add thereto some, more or less inert, powdered substance capable of preventing premature reaction between the acid and alkaline salts.

It is to be understood that the respective acid and alkaline salts to be employed, which are to be mixed in the solution to be clarified, may be separately dissolved and added thereto in separate streams, at the same time. It is to be understood that said two salts may be mixed as above described in equivalent proportions, if it is desired that they shall not modify the acidity or alkalinity of the solution to which they are added. On the other hand, the solution may be modified in this respect if desired, by employing a relatively excessive amount of one or the other of said salts.

The improved process above described, is advantageous in economy of water, time, tank room, and the avoidance of waste; the resultant clarified solution being immediately fitted for introduction to the precipitation boxes without the preliminary filtration heretofore required.

Although I have described my improved process as applied to the clarification of a cyanid solution, it is to be understood that it is applicable to the concentration and recovering of the fine flour and flake gold of placer mines.

I do not desire to limit myself to the precise details of procedure above specified, as it is obvious that various modifications may be made therein without departing from the essential features of my invention as defined in the appended claims.

I claim:—

1. The process of separating suspended matter from a liquid containing mineral value, which consists in adding to said liquid sodium carbonate and aluminum sulfate in such proportions as not to substantially affect the degree of alkalinity of said liquid.

2. The process of separating suspended matter from a liquid containing mineral value, which consists in adding to said liquid sodium carbonate and aluminum sulfate in a liquid state, in such proportions as not to substantially affect the degree of alkalinity of said liquid.

In testimony whereof I have hereunto signed my name at Philadelphia, Pennsylvania, this thirtieth day of September 1908.

PROSPER JEAN AUGUSTE MAIGNEN.

Witnesses:
ARTHUR E. PAIGE,
CASPER S. BUTCHER.